March 11, 1969
F. WEINROTTER ET AL  3,432,501
PROCESS FOR THE PREPARATION OF MELAMINE
Filed April 4, 1967
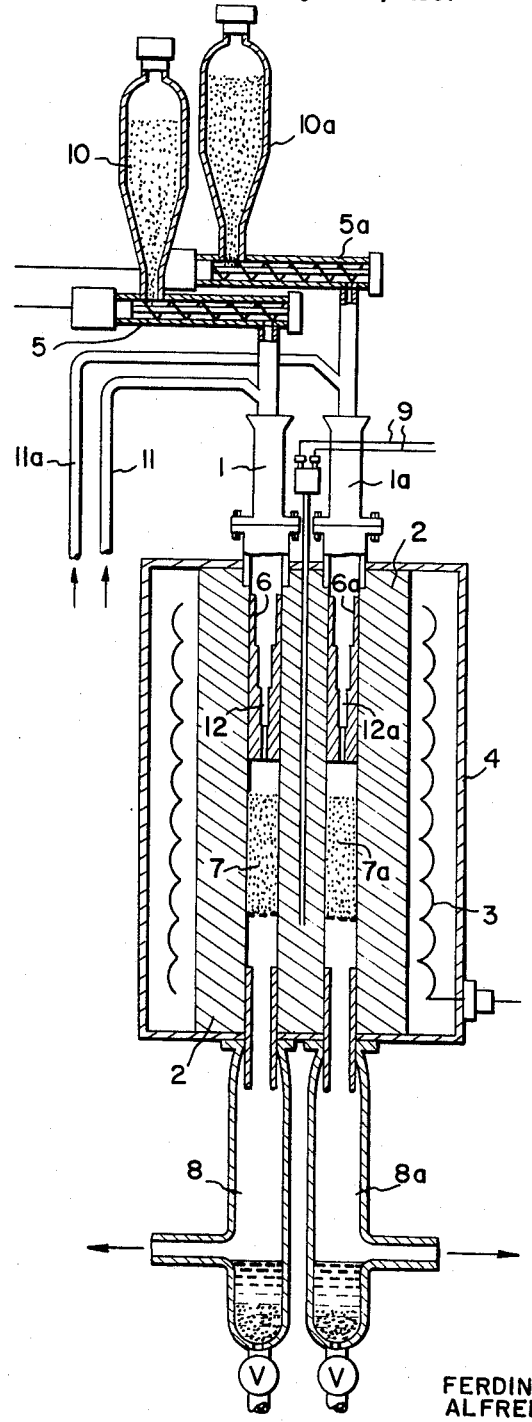
INVENTORS
FERDINAND WEINROTTER
ALFRED SCHMIDT
WALTER MÜLLER
WALTER BÖHLER
BY Wenderoth, Lind & Ponack, ATTORNEYS 3,432,501
PROCESS FOR THE PREPARATION OF MELAMINE
Ferdinand Weinrotter and Alfred Schmidt, Linz, Walter
Müller, Leonding, near Linz, and Walter Böhler, Linz,
Austria, assignors to Osterreichische Stickstoffwerke
Aktiengesellschaft, Linz (Danube), Austria
Filed Apr. 4, 1967, Ser. No. 628,434
Claims priority, application Austria, Apr. 5, 1966,
A 3,218/66
U.S. Cl. 260—249.7
Int. Cl. C07d 55/28
4 Claims

ABSTRACT OF THE DISCLOSURE

Superior and technically useful results are obtained in the synthesis of melamine from urea or the like in the presence of ammonia, if the synthesis is effected with the aid of crystalline aluminum oxide of small internal surface (80 to 150 square meters per gram), more especially $\gamma$-Al$_2$O$_3$, as catalyst. After prolonged operation (e.g. about 90 days), such catalysts with small internal surface retain substantially their original activity.

---

Various methods have recently been described for the preparation of melamine, according to which urea or its thermal decomposition products such as cyanic acid, cyanuric acid, biuret, triuret, ammeline or ammelide are converted into melamine in the presence of added ammonia. If such synthesis is carried out at atmospheric pressure or slightly above atmospheric pressure, a catalyst is required if technically useful yields are to be realized.

Heretofore, the literature has described two fundamentally different types of catalysts: amorphous substances with a large interior or inner surface and crystalline substances with practically no interior surface.

Amorphous substances with an interior surface of 180 to 650 square meters per gram are known; these comprise, for example, silica gel, alumina gel, titanium, oxide gel, zirconium oxide gel, kieselguhr, pumice, etc. These substances all have in common the amorphous structure and the high internal surface. The yields of melamine achievable with these catalysts varies between 10 and 92% of the theoretical yield obtainable according to the reaction scheme:

$$6(NH_2)_2CO \rightarrow C_3H_3(NH_2)_3 + 6NH_3 + 3CO_2 \quad (1)$$

depending upon the reaction conditions and the particular catalysts employed.

Other catalysts with no especially large internal surface are for example boron phosphate and aluminum phosphate. The yields of melamine realizable with these are up to 90%.

In addition, there are mixed catalysts, consisting of oxides of aluminum, titanium, silicon, zirconium, vanadium, chromium, iron or of carbon in admixture with an oxygen compound of phosphorus, boron, sulfur or arsenic. These substances have no internal surface. Yields of melamine achievable therewith are up to 90% of the theoretical.

Finally, catalysts have been described which consist of an aluminum oxide carrier with phosphorus-containing compound, sulfur-containing compound, boron-containing compound or arsenic-containing compound supported thereon, melamine yields obtainable therewith being up to 90.8% of the theoretical.

Examples of use of the above-enumerated catalysts, however, involve an operating period of only several hours or maximally one day. However, the technical utility of a catalyst on the basis of such data is out of the question, since a life of at least several months with undiminished or substantially undiminished activity is essential. All published data with respect to yields must therefore be evaluated and compared with caution, since valid conclusions as to the true value of a catalyst can only be drawn from the results of long-lasting tests (prolonged operating periods).

None of the heretofore-known classes of catalysts has shown satisfactory behavior in technical operation. The amorphous, large-surface substances retain a considerable amount of melamine because of their high adsorptive capacity, so that the retained melamine lingers on the hot catalyst surface before it sublimes off with the ammonia gas-carrier stream. Since, at the employed reaction temperature (350–470° C.), the melamine is no longer fully stable, a small portion thereof is continuously condensed to higher, no-longer-sublimable substances, so that in time the catalyst becomes inactive. Moreover, such large-surface catalysts are very sensitive substances which lose their catalytic property even when only slight changes—such as are unavoidable in technical operation—occur in the synthesis conditions. It is also known that amorphous silica gel tends to crystallize at high temperatures and this tendency is catalyzed by even traces of ammonia. As a result of such crystallization, the silica gel granules lose their coherence and disintegrate into dust form. This means that in the melamine synthesis, the product is always contaminated with catalyst dust and that after a certain period of operation the catalyst layer becomes clogged with the dust.

According to the invention, use is made of a substance which, surprisingly, offers the advantages of both known classes of catalysts and is free of the disadvantages thereof. This substance is crystalline aluminum oxide—particularly $\gamma$-aluminum oxide—which, in contrast to the large surfaced alumina gels, has an inner surface of only 80 to 150 m.$^2$/g. Crystalline aluminum oxide of this character is commercially available for other uses. It can be prepared e.g. by heating aluminum hydroxide at a rate of 1 to 10° C. per minute to 400–500° C. in the presence of water vapor at superatmospheric pressure (1.5–10 ata).

As a result of the crystalline structure of crystalline aluminum oxide, this catalyst—particularly the

is significantly more stable and thus essentially insensitive to irregularities in operation.

The advantages of the catalysts according to the invention in comparison with the prior known catalysts will be evident from the following comparative test data:

The test apparatus employed is shown diagrammatically in the accompanying figure of drawing.

Two identical glass contact tubes 1 and 1a, each having a clear inner cross section of 12.5 square centimeters, are mounted side by side in respective corresponding bores provided in an aluminum block furnace 2. The latter is electrically heated with the aid of per se conventional electrical resistance heaters 3, a constant temperature of 380° to 385° C. being automatically maintained. Conventional temperature measuring means 9 are provided. The heaters are arranged around the block 2 in a housing 4 encompassing the block. Accurately controllable screw conveyor feeding members 5 and 5a feed prilled urea of a grain size of 2 millimeters supplied from the supply containers 10 and 10a into the upper ends of the respective tubes 1 and 1a. The quantity of urea is in each case 25 grams per hour. Similarly, 42 normal liters of ammonia per hour are supplied at the upper end of each contact tube 1 and 1a via conduits 11 and 11a. Aluminum tubes 6 and 6a are arranged in the intermediate part of the glass contact tubes 1 and 1a to provide a progressively restricted portion 12 and 12a, respectively, after the manner shown in the drawing, thus defining a conversion chamber thereabove in each tube 1 and 1a, in which chambers are supplied solid urea is converted into cyanic acid and ammonia. The result is a cyanic acid-ammonia mixture with a cyanic acid content of 15% by volume. This gas mixture then passes to and through the respective catalyst layers 7 and 7a positioned below the restricted portions 6 and 6a. The catalyst consists of granules of 2 to 3 millimeters diameter. The catalyst volume in each contact tube amounts to 200 milliliters, the height of each catalyst layer being 16.5 centimeters.

The hot reaction gases leaving the catalysts contain ammonia, carbon dioxide, unreacted cyanic acid and gaseous melamine and move down to the respective receivers 8 and 8a which are filled with water, as illustrated. The reaction gases are cooled to ambient temperature in the said receivers, whereupon all the melamine separates out as a fine crystalline suspension and is determined gravimetrically as oxalate. The unreacted cyanic acid gas is dissolved in the water as ammonium cyanate which is immediately rearranged to urea and, as such, remains dissolved in the water. Ammonia and carbon dioxide remain in the aqueous melamine suspension until the latter is saturated and then pass out of the respective receivers as steam-saturated ammonia-carbon dioxide admixture.

The catalyst in one of the contact tubes consists of crystalline $\gamma$-aluminum oxide with an inner surface of 100 m.$^2$/g., determined according to the BET-method. The catalyst has a grain size of about 2 mm. and a weight of 0.81 kilogram per liter.

The catalyst in the other contact tube is a silica gel catalyst with an inner surface of 650 m.$^2$/g., determined according to the BET-method. The grain size is also about 2 mm. and the weight is 0.65 kg./liter.

Both contact tubes are operated uninterruptedly for 90 days under strictly identical conditions:

Each hour 25 grams of urea and 42 normal liters of ammonia are supplied to each contact tube. This means that an ammonia-cyanic gas mixture containing 15% by volume of cyanic acid enters each contact layer at a flow speed of 5 normal liters per square centimeter of contact cross section. The temperature of the aluminum block reaction furnace is maintained at 380–385° C. during the entire test period.

The melamine yields achieved with the two catalysts over a 90-day period of operation give the following picture:

With essentially the same initial capacity of the two contact catalysts (melamine yields between 94 and 95%, relative to the urea employed), the activity of the silica gel with a large inner surface (650 m.$^2$/g.) drops in the first 10 to 15 days of operation, while the activity of the crystalline $\gamma$-aluminum oxide with an inner surface of only 100 m.$^2$/g. remains essentially unimpaired.

After 90 days of operation, the yield with the silica gel contact is only 84% while that with the $\gamma$-aluminum oxide remains at 92%. This demonstrates that the activity of a contact with large inner surface rapidly decreases to a significant extent, in the long-continued synthesis of melamine, while the activity of the contact with small inner surface remains essentially constant.

The other catalysts enumerated in Table 1 (which follows) were subjected to comparative testing under the same conditions and for a period of 25 days of uninterrupted operation. The results set forth in Table 2 (infra) confirm that contacts with small inner surfaces retain their activity for a longer period of time.

TABLE 1.—CATALYSTS EMPLOYED

| No. | Catalyst | Structure | Inner surface. (m.$^2$/g.) |
|---|---|---|---|
| 1 | Silica gel | Amorphous | 650 |
| 2 | Aluminum silicate | do | 570 |
| 3 | Alumina gel | do | 500 |
| 4 | do | do | 380 |
| 5 | Borophosphate | Crystalline | 5 |
| 6 | Silica-phosphoric acid | Amorphous | 1 |
| 7 | Aluminum oxide | Crystalline | 100 |
| 8 | do | do | 50 |

TABLE 2.—COMPARATIVE TEST RESULTS

| Catalyst No. (cf. Table 1) | Percent conversion (maximal) | Percent conversion (average over 25 days operation) |
|---|---|---|
| 1 | 94.3 | [1] 89.8 |
| 2 | 90.0 | 88.1 |
| 3 | 91.5 | 90.1 |
| 4 | 91.0 | 90.4 |
| 5 | 81.2 | 82.8 |
| 6 | 83.0 | 81.1 |
| 7 | 95.0 | [1] 93.1 |
| 8 | 91.1 | 90.3 |

[1] Average over 90 days operation.

While silica gel gives a high maximal conversion, the average conversion is significantly less, since there is a strong decrease in activity.

The $\gamma$-Al$_2$O$_3$ catalyst, as aforedescribed, can be used in any known catalytic synthesis of melamine. An example of such application is, for instance, the following:

EXAMPLE

A starting gas mixture of 37 cubic meters of cyanic acid and 373 cubic meters of ammonia is passed hourly through a single, loose, granular catalyst layer of 3150 kilograms of granular $\gamma$-Al$_2$O$_3$ with an internal surface of 80 to 150 m.$^2$/g., the volume of such catalyst amounting to about 3.5 cubic meters. The catalyst-filled chamber is preferably cylindrical, the circular bottom surface being 9.8 square meters in area and the height of the catalyst layer being about 0.36 meter. The catalyst layer is neither extraneously heated nor extraneously cooled. The temperature of the cyanic acid-ammonia gas mixture upon entry thereof into the catalyst layer is 320° C. During the synthesis, the temperature of the catalyst layer, as measured by thermoelements, is 430° C. In a single passage of the starting gas mixture through the catalyst layer, there is a 95% conversion. All the reaction heat liberated at the contact layer is dissipated as perceptible heat of the reaction gas mixture.

The hot reaction gas is, directly upon leaving the synthesis furnace, cooled by means of a circulating aqueous melamine suspension and the thus-accumulated finely crystalline melamine is separated off by means of a centrifuge. Care must be taken in this regard that the hot synthesis gas comes into contact with cooler particles which are not washed with cooling liquid. Unconverted cyanic acid (at most 5% of the initial amount) will be in solution as urea in the cooling liquid. To avoid too great an accumulation of urea in the said liquid, a portion of mother liquor circulated back from the centrifuge is from time to time withdrawn. The gaseous ammonia and carbon dioxide contained in the reaction gas mixture is dissolved only in small amount in the aqueous melamine suspension. The major portion leaves the suspension container as NH$_3$/CO$_2$/H$_2$O vapor mixture and can be salvaged.

The centrifuged melamine is washed free of urea and the wash water is added to the melamine suspension. The centrifuge wet melamine is then dried. Impurities in the dried melamine are not detectable by conventional tests. In any event, the impurities which can cause clouding lie Ammeline+ammelide: below 0.1%
Melamine cyanurate: below 0.01%

(Ammeline and ammelide cyanurate)

Residual moisture is below 0.01%
Ash is below 0.01%
Color test: below 20 APHA

The determined nitrogen value of the melamine is 66.62% N. In other words, even without recrystallization, the melamine has a purity of about 99.90%.

Under the recited conditions, the catalyst retains its activity for as long as six months or more.

The conversion takes place essentially at atmospheric pressure, the only pressure employed being that required to effect passage of the initial gaseous reaction mixture uniformly through and throughout the catalyst layer.

What is claimed is:

1. In a process for the catalytic synthesis of melamine from urea or thermal decomposition products thereof at normal or slightly elevated pressure in the presence of ammonia gas, the improvement according to which the synthesis is carried out in the presence, as catalyst, of crystalline aluminum oxide with an internal surface of 80 to 150 square millimeters per gram.

2. The improvement according to claim 1, wherein the crystalline aluminum oxide is $\gamma$-$Al_2O_3$.

3. The improvement according to claim 1, wherein the starting substances are gaseous cyanic acid and ammonia.

4. The improvement according to claim 2, wherein the catalyst is $\gamma$-$Al_2O_3$.

References Cited

UNITED STATES PATENTS

| 2,760,961 | 8/1956 | Mackay | 260—249.7 |
| 3,095,416 | 6/1963 | Crowley et al. | 260—249.7 |
| 3,158,611 | 11/1964 | Crowley et al. | 260—249.7 XR |
| 3,163,648 | 12/1964 | Kaess et al. | 260—249.7 |
| 3,290,309 | 12/1966 | Marten | 260—249.7 |
| 3,310,559 | 3/1967 | Weinrotter et al. | 260—249.7 |

HENRY R. JILES, *Primary Examiner.*

JOHN M. FORD, *Assistant Examiner.*